United States Patent [19]

Ingle

[11] 4,070,444
[45] Jan. 24, 1978

[54] LOW COST, HIGH VOLUME SILICON PURIFICATION PROCESS

[75] Inventor: William Martell Ingle, Phoenix, Ariz.

[73] Assignee: Motorola Inc., Schaumberg, Ill.

[21] Appl. No.: 707,153

[22] Filed: July 21, 1976

[51] Int. Cl.² .................. C01B 33/02; C01B 33/08
[52] U.S. Cl. ................................ 423/349; 423/341
[58] Field of Search .................. 423/349, 341, 348

[56] References Cited

U.S. PATENT DOCUMENTS 2,840,588   6/1958   Pease .................................. 423/341 X

FOREIGN PATENT DOCUMENTS 1,094,760   5/1955   France ................................ 423/349
327,712     2/1958   Switzerland ....................... 423/349

OTHER PUBLICATIONS

J. W. Mellor's "A Comprehensive Treatise on Inorganic and Theo. Chem.," vol. 2, 1922 Ed., p. 66, Longmans, Green & Co., N.Y.

*Primary Examiner*—Edward Stern
*Attorney, Agent, or Firm*—John A. Fisher

[57] ABSTRACT

Truly amorphous silicon having a low level of undesired impurities, and therefore suitable for semiconductor applications, may be prepared by the present process. Impure silicon, for example, metallurgical grade silicon, is prepared at an elevated temperature, e.g., above 1400° C. The impure silicon and at least one binary silicon fluoride compound, e.g., silicon tetrafluoride, are chemically combined at the elevated temperature to form silicon difluoride gas. The silicon difluoride gas is polymerized. The silicon difluoride polymer is then thermally decomposed to produce the purified, amorphous silicon and binary silicon fluoride by-products. The binary silicon fluorides are recycled in the process to be chemically combined with the impure silicon. That step and the succeeding steps serve to reduce the level of unwanted impurities in the silicon produced by at least several orders of magnitude.

12 Claims, 2 Drawing Figures

LOW COST, HIGH VOLUME SILICON PURIFICATION PROCESS

BACKGROUND OF THE INVENTION

1. Field of the Invention

This invention relates to a process for obtaining purified silicon. More particularly, it relates to a process for preparing highly purified silicon in high volume, at low cost, suitable for use in fabricating silicon solar cells and other semiconductor devices. Most especially, it relates to a process which will prepare truly non-crystalline, amorphous silicon material having a low level of undesired impurities in sheet form.

2. Description of the Prior Art

Due to increased costs and increasingly unacceptable effects on the environment from other energy sources, there has recently developed a greater interest in the use of photovoltaic silicon solar energy cells as a means for the large scale production of electrical energy. Such silicon solar energy cells are presently well known in the art. However, present processes both for obtaining silicon of sufficient purity to fabricate such devices and present processes for fabricating the devices themselves in the silicon are costly enough to preclude the utilization of such solar energy cells except in space satellites and other equipment intended for remote locations where conventional techniques for generating electricity are unavailable.

Most of the semiconductor grade silicon produced in the United States today is obtained by the reaction of metallurgical grade silicon with anhydrous hydrochloric acid at about 325° C in a fluidized bed to produce trichlorosilane. The trichlorosilane is purified by distillation techniques, then converted into semiconductor grade polycrystalline silicon by thermal rearrangement. The polycrystalline silicon is then formed into ingots of single crystal silicon in a Czochralski furnace. The single crystal ingots are then sliced, lapped and polished to give silicon wafers suitable for fabrication of silicon solar cells and other semiconductor devices.

In the case of integrated circuits, discrete transistors, and similar devices, these techniques for preparing semiconductor grade silicon in the form of wafers have proved to be eminently suitable. The subsequent process steps for forming such devices tend to be complex and labor intensive. Also, the quantity of silicon used per such device is quite small. Therefore, the cost of providing the semiconductor silicon grade wafers typically does not amount to a high proportion of the cost of making such devices.

However, the fabrication of silicon solar cells represents a quite different situation. A much larger volume of purified silicon than is presently being produced will be needed for silicon solar cells to produce a significant amount of even the present requirements of electrical energy. It has been estimated that an area of silicon solar cells roughly equal to the area of all of the paved road in the United States today would be necessary to duplicate the existing conventional and nuclear electrical generating capacity in the United States. Further, processes for making silicon solar energy cells tend to be less complex than most integrated circuit processes. Thus, the cost of providing raw silicon substrates represents a higher proportion of solar energy cell cost than it does of integrated circuit cost.

The present cost for manufacturing semiconductor grade silicon is about $60.00 per kilogram. The cost of producing this raw material must be reduced at least to about $10.00 per kilogram in order to have any realistic chance of large scale successful use of silicon solar cells as a photovoltaic energy source. In addition, the overall cost of producing solar cells must be reduced by about two orders of magnitude in the next decade to be cost competitive with other methods for producing electrical energy. This can only be achieved by a continuous flow, highly automated process. Many of the steps presently used in the fabrication of semiconductor grade silicon are incompatible from a continuous process point of view. Thus, modification or straightforward automation of the present production processes for semiconductor grade silicon do not have the potential of reaching the required cost reduction goal. While U.S. Pat. No. 2,840,588 teaches that polymerized silicon difluoride can be pyrolized to produce silicon, it contains no indication that such a technique would be advantageous for large scale production of silicon.

A related problem area is the energy consumption required for the production of silicon solar cell arrays with present techniques. Currently, the energy consumed in the production of metallurgical grade silicon, its purification to semiconductor grade silicon, the fabrication of silicon solar cells in the silicon, and the assembly of the solar cell arrays amounts to about forty years' worth of electricity generation from the resulting solar cell array. This energy consumption must be reduced by a factor of ten to twnety times in order for the energy payback period to approach the goal of about 10 to 20 percent of the expected lifetime of twenty years for silicon solar cells.

For some time, investigators in the semiconductor field have speculated about the desirability of truly amorphous silicon in the fabrication of semiconductor devices. More recently, D. E. Carlson, et al, "Amorhous Silicon Solar Cell", Applied Physics Letters 28, 671–673 (1976), reports that solar cells fabricated in amorphous silicon have an enhanced efficiency over solar cells fabricated in single crystal silicon. The amorphous silicon used by Carlson et al was made from a glow discharge in silane, a process not amenable to high volume production at low cost. Amorphous silicon has the form of a glassy solid with no crystal structure. It thus does not exhibit any diffraction peaks when scanned on an x-ray deffractometer, nor does it reveal any structural features when examined under a scanning electron microscope, even at a magnification of 100,000 X.

Thus, while the art of preparing semiconductor grade silicon is a well developed one, there remains a need for further development of a basic process which will meet the need for high volume production at low cost of purified silicon, suitable for silicon solar cell applications, as well as for a process which will produce amorphous silicon in volume.

SUMMARY OF THE INVENTION

Accordingly, it is an object of this invention to provide a process for preparing silicon of a sufficient purity for silicon solar cell use which is tailored for operation on a continuous basis.

It is another object of the invention to provide a continuous process for preparing silicon of sufficient purity for silicon solar cell use, in which energy supplied for one part of the process may be used in another part of the process and by-products of the process may be recycled to earlier steps of the process.

It is still another object of the invention to provide a process for preparing raw material silicon in which the chemical reactions utilized to produce the silicon also result in its purification.

It is still another object of this invention to provide a process which will produce truly amorphous silicon in volume.

The attainment of these and related objects may be achieved through use of the novel purified silicon production process herein disclosed. In accordance with the invention, pure silicon is produced by chemically combining impure, e.g., metallurgical grade, silicon and at least one binary silicon fluoride compound, such as silicon tetrafluoride, to form silicon difluoride gas at a temperature of at least about 1100° C. As used herein, the term "binary silicon fluoride compound" refers to compounds of the general formula $Si_xF_{2x/2}$, such as $SiF_4$, $Si_2F_6$, $Si_3F_8$, and the like. The silicon difluoride is then polymerized. The silicon difluoride polymer is then thermally decomposed to produce silicon and binary silicon fluorides, principally silicon tetrafluoride. The binary silicon fluoride compounds produced in the thermal decomposition step are then introduced to the first step above to allow their chemical combination with the impure silicon. Preferably, the impure silicon used as a raw material in this process is metallurgical grade silicon, itself produced in a furnance at an elevated temperature and introduced to the first step of this process while still at the elevated temperature. This means that little or no additional energy must be supplied in order to produce the silicon difluoride gas from the hot metallurgical grade silicon.

Each of the steps defined above contributes to purification of the impure silicon, so that the resulting product has the level of unwanted impurities contained in it reduced by from about three to about six or more orders of magnitude. Further, the result of this process is truly amorphous silicon, the production of which in volume has long been desired.

The attainment of the foregoing and related objects of the invention should be more readily apparent after review of the following more detailed description of the invention, taken in connection with the drawings, in which:

DETAILED DESCRIPTION OF THE INVENTION

Figure 1:
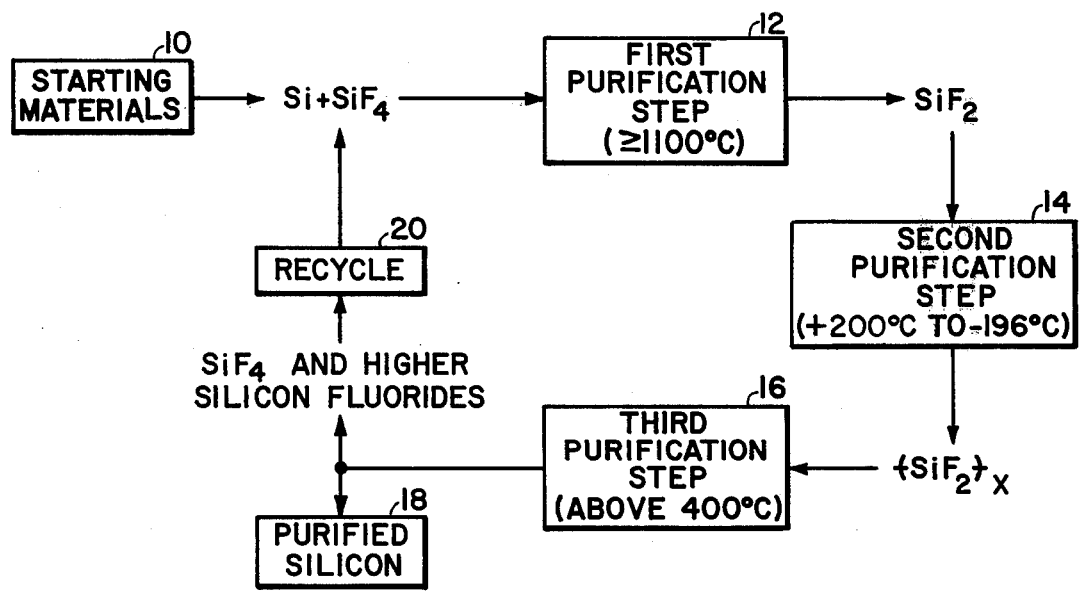
FIG. 1 is a representative flow diagram of a process in accordance with the invention.

Turning now to the drawings, more particularly to FIG. 1, there is shown a flow diagram of a preferred form of the process of this invention. As indicated by the box 10, the beginning raw materials for this process are preferable metallurgical grade silicon and silicon tetrafluoride. Metallurgical grade silicon is presently produced in large quantities by use of an arc reduction furnace. The silicon is produced in such furnaces in the molten state. Unlike prior art fluidized bed processes used to produce pure silicon via trichlorosilane, the practice of this invention may utilize the metallurgical grade silicon directly from the arc reduction furnace, while it is still in the molten or heated state. As such, it can be reacted with the silicon tetrafluoride to produce the silicon difluoride at a temperature in excess of about 1100° C without supplying additional thermal energy for the formation of the silicon difluoride to take place.

A further reason why metallurgical grade silicon is preferred for practice of this invention is the discovery that metallic contaminants in the metallurgical grade silicon serve to catalyze the reaction between the silicon and the silicon tetrafluoride or other binary silicon fluoride compounds. The effect of this catalyzation is to increase the reaction rate by as much as an order of magnitude within the reaction conditions employed in this invention. This effect is especially pronounced when the metallurgical impurities include a substantial amount of copper. In some instances, it may be advantageous to add copper or another metallic impurity which will catalyze the silicon-silicon tetrafluoride reaction to the metallurgical grade silicon. It should be noted that these catalytic impurities, like other non-catalytic impurities in the metallurigical grade raw material silicon, are separated from the desired reaction products in this invention by the chemical reactions which take place in the process. Higher impurity levels are not observed in the end product silicon when metallic impurities in the raw material metallurgical grade silicon are used to catalize the silicon-silicon tetrafluoride reaction.

Large quantities of silicon tetrafluoride are currently produced as a by-product in the production of fertilizer. At present, there is no commercial use for a major portion of the by-product silicon tetrafluoride.

As indicated by box 12 in the flow diagram of FIG. 1, the reaction of metallurgical grade silicon and silicon tetrafluoride to produce silicon difluoride represents the first purification step in the present process. This is true because the conversion of the silicon and silicon tetrafluoride to silicon difluoride does not involve breaking of silicon-fluorine bonds, but a rearrangement. Very little fluorination of impurities occurs because the silicon-fluorine bond energy of 142 kilocalories per mole is extremely strong. This bond would have to be broken to form another bond to a different element, which is in most cases energetically unfavorable. A second reason why purification occurs is that nearly all the known metal fluorides that are stable and volatile at the reaction condition of at least about 1100° C are either unstable or nonvolatile at room temperature. Partial evidence for this is found in the fact that small quantities of nonvolatile impurities are observed at lower temperatures during the reaction.

At temperatures below about 1100° C, little or no conversion to the silicon difluoride gas takes place. Best results for a fluidized bed process are obtained with temperatures between about 1300° C and about 1400° C. In addition, the process of this invention can be carried out at temperatures above 1420° C, the melting point of silicon, preferably by using the molten silicon directly from an arc reduction furnace used to prepare it. This results in a higher transport rate. No advantage is seen in raising the temperature significantly above 1420° C even though this increases the transport rate still further, since the trade-off in terms of increased energy requirements is not favorable.

The conversion rate of silicon and silicon tetrafluoride to silicon difluoride gas tends to be low at high pressures. This disadvantage can be overcome by reducing the gas pressure in the reaction chamber to about 50 millimeters of mercury or less in order to obtain a high conversion rate of silicon into silicon difluoride gas. Under these conditions, a large volume of silicon tetrafluoride is passed through the reactor in order to obtain large quantities of silicon difluoride gas. Doing this presents no particular problem, since the silicon tetrafluoride is an inexpensive raw material, and it may be recycled in the process.

The silicon difluoride gas is then polymerized by a condensation reaction, generally at a temperature of less than about −45° C, preferrably between about −45° C and about −160° C. While the silicon difluoride gas is unstable at low temperatures, it can be cooled to room temperature for brief periods of time before polymerization. This may cause some pre-polymerization, which has the effect of providing nucleating sites for impurities, resulting in their preferential removal from the gas. Thus, one modification of the process is to form an initial quantity of the silicon difluoride polymer rich in impurities at a first temperature and pressure, then form an additional quantity of the polymer substantially free of the impurities at a second temperature lower than the first temperature. For this purpose, the first quantity of polymer is desirably formed at a temperature of from about −45° C to about 200' C, and a pressure of at least about 150 microns Hg. The additional quantity of polymer is desirably formed at a temperature between about −45° C and about −160° C. As a result of this modification, the additional quantity of the polymer has a substantially lower impurity level than would be the case if the first quantity of polymer were not formed. The silicon difluoride gas should be rapidly cooled to the condensation reaction temperature, preferably in about one second or less. As indicated by the box 14, the polymerization is a second purification step in the process. Only those impurities which are liquids or solids at the polymerization temperature will be incorporated in the polymer. Most of the common possible impurity dopants for the polymerization, such as $BF_3$, $PF_3$, $PF_5$, $AsF_3$, and the like have boiling points below the polymerization temperatures employed. They therefore will not be incorporated into the polymerized silicon difluoride polymer. It should further be noted that should additional purification beyond that which can be obtained by formation of the silicon difluoride and polymerization of it, the silicon difluoride gas is itself in a convenient form for further purification. Thus, if any undesired impurity should show up in the semiconductor grade silicon produced by the process of this invention, it can be conveniently removed from the silicon difluoride gas in order to eliminate it in the semiconductor grade silicon. Further, it should be noted that, if reduction in impurities by three to six orders of magnitude, as occurs in the present process, is not sufficient, then the process of this invention can be repeated using the silicon initially obtained from practice of the invention as silicon raw material for a repeat of the process. If a particular impurity is desired in the silicon as a dopant, it can be introduced to the silicon difluoride gas in a solid or liquid form at the polymerization temperature in order to incorporate it into the silicon difluoride polymer, and ultimately in the silicon product.

As indicated by the box 16, the polymerized silicon difluoride is pyrolized at a temperature of at least about 400° C, causing it to undergo thermal rearrangement to produce semiconductor grade silicon as the desired product of the process, indicated at 18, and silicon tetrafluoride as a by-product of the process, which may be recycled to the start of the process to produce additional silicon difluoride gas, as indicated by the box 20. Similar thermodynamic and kinetic effects as discussed above in the preparation of the silicon difluoride gas and its polymerization apply to produce some additional purification as a result of the thermal rearrangement. Generally, temperatures between about 400° C and 800° C are suitable for the thermal rearrangement. The silicon tetrafluoride recycled from the thermal rearrangement step for reaction with metallurgical grade silicon in the first step of the process is itself also in purified form as a result of the reaction to form silicon difluoride gas, the polymerization, and the thermal rearrangement.

The purified silicon produced by the process of this invention is of semiconductor grade, i.e., it is suitable for the fabrication of silicon solar energy cells, discrete transistors, integrated circuits, and the like. It is of similar impurity content to that manufactured today in the industry for semiconductor applications.

A modification of the above process is especially advantageous where it is desired to produce the semiconductor silicon directly in sheet form, which is highly advantageous for a continuous process. In accordance with this modification, the polymerized silicon difluoride is initially formed at a first temperature, such as about −78° C, at which temperature the polymer will form on a suitable substrate having a different coefficient of thermal expansion than the polymer, such as quartz or silicon dioxide. The temperature is then lowered to a second temperature, for example about −196° C, thus allowing the polymer on the substrate in continuous sheet form to be lifted easily from the substrate, due to the difference in thermal expansion coefficients for the polymer and the substrate. This will allow easy separation of the polymer in sheet form the substrate and its subsequent pyrolization to produce the semiconductor grade silicon sheet.

As indicated previously, the semiconductor grade silicon produced by the process of this invention has an amorphous structure. This means that the material has the properties of a super cooled liquid, and no crystal lattice structure. There is a substantial increase in efficiency for solar cells fabricated in amorphous silicon over conventional single crystal silicon. Thus, it is preferred to use the silicon directly in this form to fabricate the solar cells. If desired, the amorphous silicon also may be readily converted to single crystal silicon by intimate contact with a single crystal of silicon.

Figure 2:
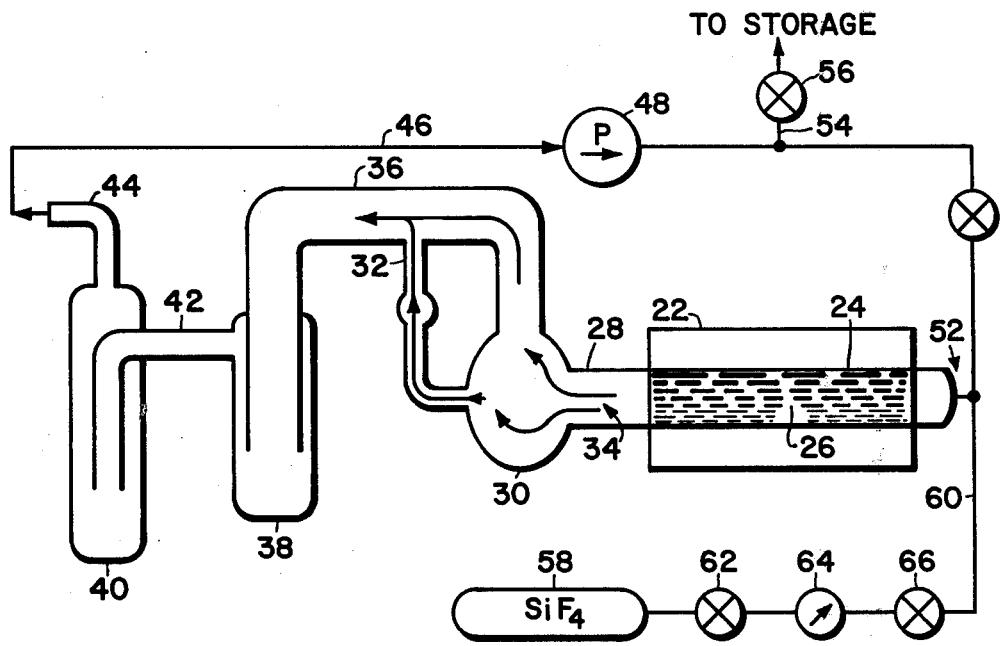
FIG. 2 is a diagram, partly in schematic form, of apparatus suitable for practicing the invention.

FIG. 2 shows apparatus in schematic form suitable for practicing the process of this invention. The apparatus includes a high temperature furnace 22, capable of being heated to at least about 1300° C. A process tube 24 is mounted in the furnace 22. The tube 24 should be made of a material which is capable of withstanding the elevated temperatures used in the process. For this purpose, a ceramic tube with a thin quartz sleeve on its inside wall has proved to be most suitable. Metallurgical grade silicon 26 is disposed in the portion of the tube 24 contained within the furnace 22. The siicon 26 may either be in pulverized form, or if temperatures in excess of the melting point of silicon are employed, in the molten form. End 28 of tube 24 is connected to baffle 30, which is fabricated of quartz. The quartz baffle, in cooperation with side passage 32, serves to remove any particulate contaminants in the reactant gas stream 34 coming from tube 24. Additionally, if the modified form of the process is utilized in which a higher temperature and pressure is initially used to form a quantity of impurity rich silicon difluoride polymer, this is desirably formed in baffle 30 or upstream of it. By so doing, any of this polymer or silicon produced from it which flakes off the apparatus will be trapped as particulates in the baffle 30. Tube 36 connects baffle 30 and a first cold trap 38, in which the desired silicon difluoride polymer is collected. A second cold trap 40 is connected to the first cold trap 38 by means of tube 42. Exit 44 of the second cold trap 40 is connected by means of line 46, pump 48 and valve 50 to the inlet end 52 of tube 24. Line 54 and valve 56 alternatively connect the exit 44 of second trap 40 to a storage tank or other facility for collection of reactant gases (not shown). Silicon tetrafluoride source tank 58 is connected to the inlet end 52 of the tank 24 by means of line 60, on-off valve 62, pressure regulator 64 and mass flow controller 66.

In operation, the tube 24 is charged with the metallurgical grade silicon 26 and brought to the reaction temperature. Valve 62 is opened, allowing silicon tetrafluoride from tank 58 to flow into line 60. Pressure regulator 64 is set to a pressure level which can be withstood by the tube 24. Mass flow control 66 is then opened to allow the silicon tetrafluoride gas to flow into tube 24. The silicon tetrafluoride and silicon react to form silicon difluoride gas in accordance with the first step shown in FIG. 1. The silicon difluoride gas flows out end 28 of tube 24, through quartz baffle 30, and into first cold trap 38, which is maintained at a temperature between about −200° C and about −45° C, depending on the reaction conditions desired for formation of the silicon difluoride polymer in accordance with the second step shown in FIG. 1. The second cold trap 40 may also be used for collection of additional silicon difluoride polymer, or for collection of by-product silicon tetrafluoride and other by-products, depending on the reaction conditions for formation of the polymer. If desired, a suitable substrate may be positioned in the cold traps, on which the silicon difluoride polymer is deposited.

Silicon difluoride polymer in the traps may be heated in situ above 400° C by means of a furnace (not shown) positioned around the traps, to provide the purified silicon in accordance with the third step of the process as shown in FIG. 1. As shown in FIG. 1, heating the silicon difluoride polymer to produce the purified silicon produces silicon tetrafluoride and, depending on the reaction conditions employed to produce the pure silicon, higher silicon fluorides as well. These by-products in volatilized form are recycled by means of line 46, pump 48 and valve 50 to the inlet end 52 of tube 24. Alternatively, these by-products may be sent to storage via line 54 and valve 56 for later use.

The following nonlimiting examples represent best modes contemplated by the inventor for practicing the invention and serve to describe the invention further.

EXAMPLE I

A three inch diameter reaction tube about three feet long and connected as shown in FIG. 2 is charged with chunks of impure silicon ranging from small particles of about 30 mesh to chunks about 1 inch in diameter. The silicon starting materials in the example vary from metallurgical grade silicon to scraps of polycrystalline silicon with high concentrations of carbon, molybdenum, aluminum, tungsten, iron, boron, or phosphorus.

The following generalized experimental procedure is used for this example. The tube is placed in a furnace and evacuated and heated to about 1000° C until outgassing and distillation of volatile material, such as arsenic, is complete. The outgassing and distillation continues until a pressure in the tube of 1 micron or less is observed, indicating completion. The cold traps are cooled to the temperature indicated in the table below in the case of the first cold trap, and to −196° C in the case of the second cold trap, and then silicon tetrafluoride is passed through the heated tube in the furnace to form silicon difluoride gas which condenses in the first cold trap. If the first cold trap is above the condensation temperature of silicon tetrafluoride (about −160° C), the silicon tetrafluoride and other noncondensed fluorides will pass through the first trap and condense in the second. The first trap, containing the silicon difluoride polymer, is heated under vacuum until no additional materials are distilled out at a temperature of about 500° C, thus converting the silicon tetrafluoride polymer into purified silicon. A series of six experiments was run at the times and temperatures shown in the table below, giving the yields of silicon indicated in each case.

| Exp. No. | Furnace Temperature (° C) | Time (min) | $Si_xF_y$ reacted (gms) | Silicon Purified (gms) | First Cold Trap Temp. (° C) | Percent Yield (%) |
| --- | --- | --- | --- | --- | --- | --- |
| 1 | 1110 | 20 | 8 | 0.125 | −196 | 6.0 |
| 2 | 1110 | 25 | 10 | 0.50 | −196 | 18.6 |
| 3 | 1150 | 25 | 15 | 1.14 | −196 | 28.3 |
| 4 | 1263 | 20 | 13.5 | 2.00 | −78 | 55.1 |
| 5 | 1350 | 7 | 5 | 0.99 | −78 | 73.6 |
| 6 | 1380 | 15 | 22.5 | 5.29 | −78 | 87.4 |

Analysis of the impure silicon starting material and the purified silicon product by emission spectroscopy shows that a high degree of purification is obtained. The purification process is 100 percent effective for all transition elements, i.e., concentrations of transition metal elements found in typical metallurgical grade silicon or impurities in scrap Motorola polycrystalline silicon were undetectable, indicating concentrations of less than 10 parts per million, in the purified silicon, as measured by emission spectroscopy. Similar results are obtained for the alkali and alkaline earth metals, and for phosphrous. When the polymer is formed at higher temperatures, i.e., between −45° C and −78° C, boron is also found to be absent. A reduction in the concentration of aluminum of between three and four orders of magnitude is also observed in each case.

In a physical comparison of the silicon from experiments 1-3, in which the silicon difluoride polymer is formed at −196° C, with the silicon from experiments 4-6, in which the polymer is formed at −78° C, the silicon from experiments 4-6 is formed as flat platelets of about 1 square centimeter area versus small paticles for the silicon produced in experiments 1-3. This is believed to be due to the fact that the polymerized silicon difluoride formed at −78° C stays as a continuous gelatinous sheet when warmed to room temperature and does not completely soldify until the final stages of the polymer to silicon conversion. the silicon difluoride polymer formed at −196° C apparently contains considerable quantities of silicon tetrafluoride, which make it brittle. On warming to room temperature, this polymerized silicon difluoride breaks up into small particles which fall to the bottom of the cold trap.

When a simple electrical conductivity measurement is made through a sample platelet from the polymer formed at −78° C, over 1000 volts can be applied without any measurable conduction of current. When one of the platelets is scanned from an angle of 20° (2θ) to 100° on an x-ray diffractometer, no diffraction peaks are observed in this region, not even broad ones. The platelets are then ground up to give a powder of from about 600 to 1000 mesh and the x-ray scanning repeated, with the same results. For comparative purposes, a sample of Motorola polycrystalline silicon is ground and scanned the same way, producing very intense, sharp diffraction peaks. Examination of the platelets at 100,000 X magnification on a high resolution Cambridge scanning electron microscope shows no structural features. The silicon is observed to be very dense, continuous, and nonporous, with no grains or boundaries or other structural features. on this basis, it is concluded that the silicon produced is truly amorphous.

EXAMPLE II

The procedure of Example I was repeated, except that two quartz cold traps are attached to each end of the reaction tube in the furnace. The reaction tube and traps are evacuated, and the metallurgical grade silicon raw material is outgassed at 1000° C until a vacuum of less than 1 micron is obtained. The temperature of the furnace is raised to 1180° C and 15g of silicon tetrafluoride is passed through the furnace and into the cold traps at −196° C. The set of cold traps at the other end of the furnace is then cooled to −196° C, and the first set of cold traps are allowed to warm and are then heated to 500° C, distilling out in vacuo the volatile silicon fluorides back through the heated furnace at 1180° C and into the second set of cold traps on the other side of the furnace. The resulting polymer in the second set of cold traps is then heated to 500° C. A total of 1.26g of purified silicon is recovered from the first set of traps and 0.86g of purified silicon is recovered from the second set of traps. This example shows that the silicon tetrafluoride obtained as a by-product in the thermal rearrangement of the polymer to produce the semiconductor grade silicon may be recycled as a raw material back to the step of forming the silicon difluoride gas from silicon tetrafluoride and metallurgical grade silicon.

EXAMPLE III

A quantity of 15g of $SiF_4$ is passed through a furnace at 1300° C arranged as in Example I, with the first cold trap at −78° C and the second at −196° C. After forming the polymer, the −78° trap is further cooled to −196° C which causes the polymer to lift off the surface of the quartz. When the polymer is heated to 500° C the silicon formed is large platelets about 2 to 5 centimeters in diameter. This example shows that the polymer may be easily separated from a supporting substrate, then coverted to silicon sheet.

EXAMPLE IV

The procedure of experiment number 5 in Example I is repeated, except that a wafer of single crystal silicon having a thin surface coating of about 100 Angstroms thick native $SiO_2$, a single crystal silicon wafer having 5000 Angstroms of chemical vapor deposited silicon dioxide on its surface, and a wafer of pure molybdenum are placed in a small boat in the cold trap at −78° C. The silicon difluoride polymer is condensed on the surfaces of these wafers and is converted to silicon by heating to 500° C. A dense, continuous, purified silicon film of approximately 10,000 Angstroms thickness coats the molybdenum wafer. On the two silicon dioxide coated silicon wafers, small cracks are observed, and considerable cracking and peeling off of the silicon film is observed on a major part of the silicon wafers. The procedure is repeated with a silicon wafer with the 100 Angstrom thick native silicon dioxide surface coating, but with deposition of a film of between 3000 and 4000 Angstroms thick of purified silicon produced from the silicon difluoride polymer. In this experiment a more continuous film is observed than in the case of the silicon wafers immediately above, with little or no cracking and no peeling off of the film. This example shows that silicn produced by the process of this invention may be easily deposited on conventional substrates, and may be deposited on a silicon wafer carrying the usual thin silicon oxide film, if the silicon prepared by the process of this invention is deposited as a thin film.

EXAMPLE V

Room temperature or slightly higher (up to 200° C) polymer formation has also been accomplished. In the first of two separate experiments using the same apparatus described in Example I, polymer is formed on the walls of the quartz tube at room temperature by constricting the flow (thus increasing the pressure) of the $SiF_2$ through the tube by placing a loosely packed quartz wool plug at the exit end of the tube. This polymer was cream-white in appearance but upon heating turned clear, and upon heating to 500° C converted to silicon sheet-like material.

In the second experiment the pressure in the tube was raised by increasing the flow rate of input $SiF_4$ which caused the pressure of the $SiF_2$ to increase. Again, polymer condensed out of the surface; however, in this experiment the surface was over 100° C and the polymer formed a clear, almost invisible sheet which also converted into silicon when heated to 500° C.

This example shows that enhanced conversion of silicon difluoride gas to silicon difluoride polymer takes place at room temperature when the partial pressure of the silicon difluoride gas is above about 150 microns Hg.

EXAMPLE VI

The highest degree of purification of the metallurgical grade silicon appears when the gas baffle in FIG. 2 is placed between the exit of the furnace tube and the first cold trap, which effectively removes particulates in the gas stream. Even further purification occurs when the flow rate is increased to the point where some prepolymerization of the $SiF_2$ occurs in the gas baffle. Analysis of the material collected in the baffle shows concentration of some impurities in the baffle to be an order of magnitude higher than in the starting metallurgical grade silicon. The silicon obtained from polymer formed in the first cold trap during the same run at −78° C and heated to 700° C was suitable for semiconductor device fabrication without further purification. This example shows that differences in mass transfer properties between undesired impurities and the desired silicon can be utilized to cause the impurities to deposit preferentially at a different point in the apparatus during polymerization than most of the desired silicon difluoride polymer.

It should now be apparent that a process capable of achieving the stated objects of the invention has been provided. This process will allow formation of truly amorphous silicon material of high purity in sheet form from metallurgical grade silicon and silicon tetrafluoride, both materials which are readily available and inexpensive. By-products of the process may be recycled in the process, and it allows the silicon to be prepared directly in sheet form in high volume. Tests of the silicon so produced reveal that it is truly amorphous in character, dense and continuous, as well as being in purity. On this basis, a process for producing silicon product capable of meeting the high volume, low cost requirements of the silicon solar cell field has been provided. It should be apparent to the art skilled that various changes may be made in the form and details of the present process. For example, the silicon difluoride polymer might be deposited within a layer of pulverized silicon, then converted to silicon to join the pulverized silicon together to make a continuous sheet. It is intended that such changes be included within the spirit and scope of the claims appended hereto.

What is claimed is

1. A process of producing pure semiconductor grade silicon which comprises:

chemically combining metallurgical grade silicon and at least one binary silicon fluoride compound to form silicon difluoride gas, forming a polymer of said silicon difluoride at a partial pressure of said silicon difluoride gas greater than about 150 microns Hg and at a first temperature of from about −45° C to about +200° C which will allow formation of said polymer in a continuous form on a substrate having a different coefficient of thermal expansion than that of said polymer, cooling said polymer and said substrate to a second lower temperature which will allow said polymer to be separated easily from said substrate, thermally decomposing the silicon difluoride polymer to produce silicon and a binary silicon fluoride compound, and introducing said binary silicon fluoride compound from said thermal decomposition to said step of combining with silicon, these process steps serving to remove unwanted impurities from said metallurgical grade silicon.

2. The process of claim 1 in which said binary silicon fluoride compound is silicon tetrafluoride.

3. The process of claim 1 in which the thermal decomposition of said polymer takes place in a vacuum at a temperature of at least about 400° C.

4. The process of claim 1 wherein said silicon is supplied to the process as molten silicon directly from a furnace in which said silicon is obtained.

5. A process for producing pure silicon, which comprises:

chemically combining raw material silicon and at least one binary silicon fluoride compound to form silicon difluoride gas, forming an initial quantity of a polymer of said silicon difluoride gas including impurities present in said raw material silicon or said silicon difluoride gas at a first temperature from about −45° C to about 200° C and a partial pressure of said silicon difluoride gas greater than about 150 microns Hg, forming an additional quantity of the polymer of said silicon difluoride gas at a second temperature lower than said first temperature, said additional quantity of silicon difluoride polymer being substantially free of impurities present in said silicon difluoride gas or said raw material silicon, and thermally decomposing said additional quantity of said silicon difluoride polymer to produce silicon substantially free of the impurities present in said silicon difluoride gas or said raw material silicon.

6. The process of claim 5 in which said second temperature is between about −45° C and about −160° C.

7. The process of claim 5 in which said additional quantity of said silicon difluoride polymer is formed on a substrate having a different coefficient of thermal expansion than said polymer, and the temperature of said polymer is changed to facilitate removal of said polymer from said substrate.

8. The process of claim 5 in which said binary silicon fluoride compound is silicon tetrafluoride.

9. The process of claim 5 wherein said silicon is supplied to the process as molten silicon directly from a furnace in which said silicon is obtained.

10. The process of claim 5 wherein said initial quantity of polymer is formed in a baffle for the removal of particulate impurities.

11. The process of claim 1 wherein said pure silicon produced is dense, continuous, non porous and gives no diffraction peaks when scanned on an x-ray diffractometer and shows no structural features when examined under a scanning electron microscope.

12. The process of claim 5 wherein said pure silicon produced is dense, continuous, non porous and gives no diffraction peaks when scanned on an x-ray diffractometer and shows no structural features when examined under a scanning electron microscope.

* * * * *